United States Patent
Chierego et al.

(10) Patent No.: US 9,154,016 B2
(45) Date of Patent: Oct. 6, 2015

(54) SORTING MACHINE WITH ELECTRICAL ALTERNATORS IN SUPPORTING WHEELS

(75) Inventors: Lorenzo Chierego, Varese (IT); Riccardo Macchi, Samarate (IT); Attilio Soldavini, Ferno (IT)

(73) Assignee: CINETIC SORTING S.P.A., Lonate Pozzolo (IT)

( * ) Notice: Subject to any disclaimer, the term of this patent is extended or adjusted under 35 U.S.C. 154(b) by 206 days.

(21) Appl. No.: 13/582,363

(22) PCT Filed: Mar. 4, 2010

(86) PCT No.: PCT/IB2010/000442
§ 371 (c)(1),
(2), (4) Date: Nov. 7, 2012

(87) PCT Pub. No.: WO2011/107815
PCT Pub. Date: Sep. 9, 2011

(65) Prior Publication Data
US 2013/0056330 A1    Mar. 7, 2013

(51) Int. Cl.
| | |
|---|---|
| *H02K 7/00* | (2006.01) |
| *H02K 7/18* | (2006.01) |
| *B62M 13/00* | (2010.01) |
| *B65G 47/96* | (2006.01) |
| *B65G 17/34* | (2006.01) |

(Continued)

(52) U.S. Cl.
CPC .............. *H02K 7/1846* (2013.01); *B60K 7/00* (2013.01); *B60K 7/0007* (2013.01); *B62M 13/00* (2013.01); *B65G 17/345* (2013.01); *B65G 47/96* (2013.01); *B65G 47/962* (2013.01); *H02K 1/2786* (2013.01); *H02K 7/00* (2013.01); *H02J 1/10* (2013.01); *H02J 7/32* (2013.01); *H02K 2213/03* (2013.01)

(58) Field of Classification Search
CPC .......... B62M 13/00; H02K 7/00; B60K 7/00; B60K 7/0007; B60K 2007/00; B65G 47/962; B65G 47/96; B65G 17/345
USPC ............. 198/370.03, 370.04, 370.05, 370.06, 198/370.07
See application file for complete search history.

(56) References Cited

U.S. PATENT DOCUMENTS

| | | | |
|---|---|---|---|
| 5,690,209 A | 11/1997 | Kofoed | |
| 6,802,385 B2 * | 10/2004 | Pyntikov et al. | 180/220 |

(Continued)

FOREIGN PATENT DOCUMENTS

| | | |
|---|---|---|
| CA | 2 621 599 A1 | 8/2009 |
| EP | 0 739 831 A2 | 10/1996 |
| EP | 1 352 857 A2 | 10/2003 |

*Primary Examiner* — Leslie A Nicholson, III
(74) *Attorney, Agent, or Firm* — Arent Fox LLP (57) ABSTRACT

A sorting machine comprising propulsion devices installed on ground and at least a train of interconnected carriages provided with supporting wheels including electrical alternators to supply electrical power onboard. The alternators are housed within the wheels which comprise a fixed inner ring bearing stator windings made integral with a fork supporting the wheel and a rotative outer ring hosting permanent magnets and spinning around a shaft in front of the windings. The generator wheels, when driven by the sorting machine motion, supply small contributions of electrical power which are added up into the electrical distribution bus, a cable that is common to all the interconnected carriages of the sorting machine. Small contributions add up to several kw of power amount available and the carriage servos are able to take advantage of the available power to activate the belt units in order to load parcels and sort to destinations.

14 Claims, 10 Drawing Sheets

(51) Int. Cl.
  *B60K 7/00* (2006.01)
  *H02K 1/27* (2006.01)
  *H02J 1/10* (2006.01)
  *H02J 7/32* (2006.01)

(56) References Cited

U.S. PATENT DOCUMENTS

| | | | |
|---|---|---|---|
| 7,350,607 B2 * | 4/2008 | Park et al. | 180/65.51 |
| 8,459,386 B2 * | 6/2013 | Pickholz | 180/65.51 |
| 2003/0226740 A1 | 12/2003 | Soldavini et al. | |
| 2005/0017602 A1 | 1/2005 | Arms et al. | |
| 2006/0032687 A1 | 2/2006 | Park et al. | |
| 2008/0289890 A1 | 11/2008 | Stoltzfus | |
| 2010/0163323 A1 * | 7/2010 | Pickholz | 180/65.51 |
| 2011/0000724 A1 * | 1/2011 | Heinen | 180/65.51 |
| 2011/0259658 A1 * | 10/2011 | Huang et al. | 180/65.51 |
| 2013/0233632 A1 * | 9/2013 | Kim et al. | 180/220 |

* cited by examiner

$VL = V1 \times RL(RL + R1)$
$IL = V1 \div (RL + R1)$

- 2 -

$IL = I1 + I2$
$I1 = (V1 - VL) \div R1$
$I2 = (V2 - VL) \div R2$

$IL = \dfrac{RL(R2 \times V1 + R1 \times V2)}{R1 \times R2 + RL(R1 + R2)}$ $VL) = \dfrac{RL(R2 \times V1 + R1 \times V2)}{R1 \times R2 + RL(R1 + R2)}$

- 3 -

- 4 -

If $R1 = R2 = R$ and $V1 = V2 = V$
$IL = \dfrac{V}{RL + R \div 2}$, $VL = V \times \dfrac{RL}{RL + R \div 2}$

Fig. 7

$PL = VL \times IL$
$IL = (V - Vl)/(R/N)$
$PL = VL \times (V - VL) \times N/R$
$VL \times V - VL \times VL = PL \times R/N$
$VL^{**}2 - V \times VL + PL \times R/N = 0$
$VL = (V + SQRT(V^{**}2 - 4 \times PL \times R/N))/2$

SORTING MACHINE WITH ELECTRICAL ALTERNATORS IN SUPPORTING WHEELS

CROSS-REFERENCE TO RELATED APPLICATION

This application is a National Stage entry of International Application No. PCT/IB2010/000442 filed Mar. 4, 2010, the disclosure of the prior application is hereby incorporated in its entirety by reference.

A "cross belt" sorter or sorting machine is composed of a plurality of carriages which are coupled to form a continuous train that moves along a circular track.

Every carriage is provided with an orthogonal conveyor belt that is activated for loading the item onto the belt and for unloading it at its destination.

Figure 1:
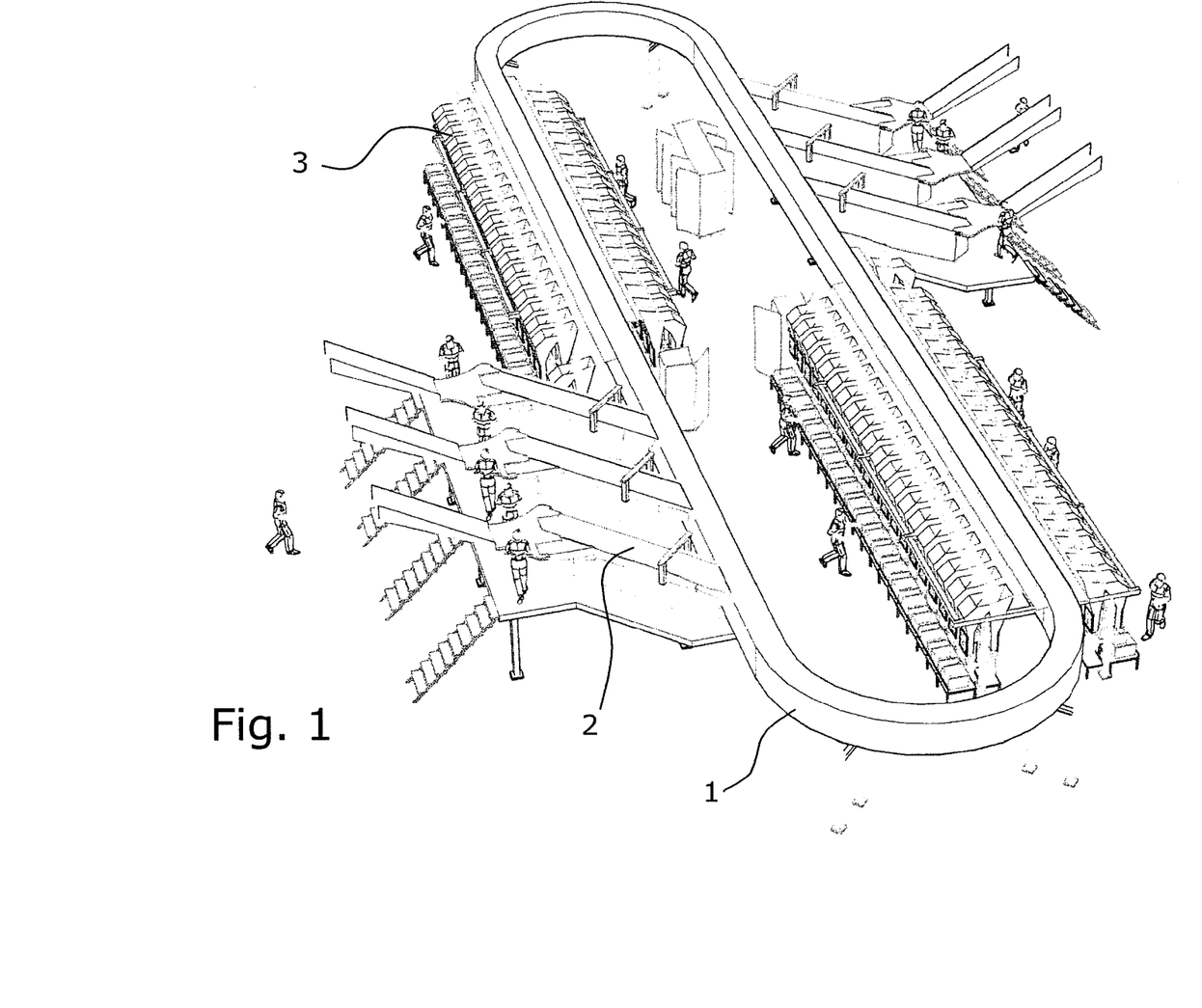
FIG. 1 is a view of a typical sorting system

The FIG. 1 shows a typical sorting system consisting of the following elements: the sorter 1, the automated loading stations 2 which transfer the items onto the orthogonal belts of the sorter, and the chutes 3 which receive the items discharged at the corresponding destination.

Figure 2:
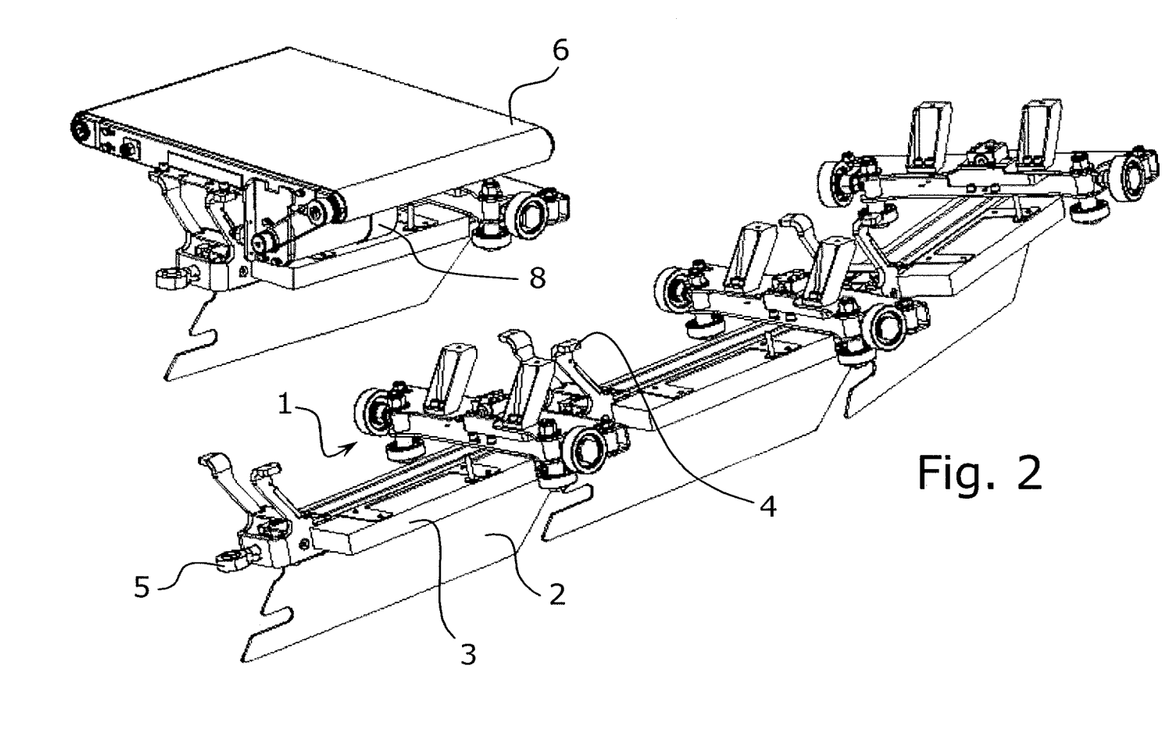
FIG. 2 shows the basic components of a cross belt sorter

The FIG. 2 shows the basic components of the cinetic cross belt sorter.

The carriages run along two parallel rails (not shown in the figure) by means of two supporting wheels 1 and two side guiding wheels.

Each carriage is provided with a vertical blade 2 by means of which it receives the thrust generated by the propellers which are distributed along the sorter track. Thrust is controlled to run the sorter at a constant speed.

The carriages are connected one to another by articulated joints 5 to form a continuous train.

The orthogonal belt conveyor 6 is fitted on the supports 4 and it is operated by the DC motor 8 that is controlled by the servo driver 3 also installed on the carriage.

Each carriage is provided with a cable with connectors (not shown on the figure) connecting the cables of carriages a common power distribution bus is obtained.

The servo driver includes electronic circuits to receive and demodulate commands and other electronic circuits to control the motor torque and speed, so that the items are sorted according to pre-set and repeatable trajectories, irrespective of their weight and physical characteristics. To carry out the item loading and unloading actions, electrical energy must be available on board of the carriages.

Below are the technological solutions that have been so far implemented to transfer the electric energy onboard of the cross belt sorters, as well as of those tilt-tray sorters that use electric motors to control the tilting:

The first solution is based on a system of conductor rails installed alongside the sorter track, supplying power onboard the machine through sliding contacts.

The conductor rails are powered with continuous current and voltage of approximately 70 V.

Generally, a couple of sliding contacts supplies power to several carriages. Among the available solutions, the one based on sliding contacts and conductor rails is simple, failure tolerant and initially the cheapest solution, but it requires periodical maintenance to replace the worn out contacts and to remove the dust originated during the sliding of the contacts on the conductor rails.

The second solution enables to transfer the energy with no contact, utilizing the principle of magnetic induction. The induction occurs in special electrical windings, named "pick up", that are onboard the carriage and passes close to a pair of electrical wires. These are laid along the sorter track and form the primary winding of a transformer while the pick up are the secondary windings of the transformer. A strong current at high frequency, as 20 kHz, flows in the cables generating the magnetic flux variable at high frequency.

The flux is responsible of magnetic induction in the secondary winding and therefore of contactless energy transfer.

This solution is currently considered the preferred for the sorters, since it provides for energy transfer without any wearing part.

But it is expensive, rather complex and requires experienced interventions for installation and commissioning.

The energy efficiency of this solution is rather low due to the energy losses in the cables and also in the conductors which are fitted near the wires.

It is generally a very robust and reliable technology, but they are possible few failures modes with some complexity on maintenance.

The third solution has been applied to only few cases so far and consists of generating the electric energy directly onboard the sorter by means of generators that get mechanical energy from the wheels of the sorter carriages; mainly two different setups have been implemented.

The machine is kept at constant speed by the driving system that is equipped with an automated speed control system and is thus able to react quickly to kinetic energy losses due to breaking force of the generators.

The solutions implemented so far turned out to be quite complex and of expensive maintenance.

The first setup is the method disclosed in EP 0739831A2 by the Company Crisplant A/S.

Each carriage is equipped with an electrical generator that is connected to one supporting wheel: the wheels are kept in rotation by friction with the track, while the sorter is moving at constant speed driven by the driving units.

The generator can produce a small amount of power, as 20 W, due to limited dimensions and sliding threshold, but the carrier needs a short peak power from 300 W to 1000 W to sort a parcel, as a function of its weight.

Therefore the Crisplant's patent includes an energy accumulator, low voltage automotive type, to be installed on each carriage, in order to accumulate the energy supplied continuously by the generator: in this way it is possible to deliver the power peak when needed.

But this solution obliges to equip each carriage with additional electronic circuitry to increase the voltage provided by the accumulator.

Moreover, use of the chemical accumulators creates problems for maintenance and pollution.

The second setup is the method disclosed in EP 1352855 where it is possible to pick up large electrical power from a single Wheel that is pushed by an articulated arm against the sorter track, in order to avoid electrochemical devices to accumulate energy.

According to certain geometrical conditions, as reported in the above patent, it is possible to avoid wheel sliding, and therefore get large, mechanical power: as increases the supplied power (and thus the braking torque working on the Wheel which would cause sliding), automatically increases also the radial force pressing the wheel against the track (which opposes to wheel sliding).

The patent EP 1352857, linked to the previous one, presents how to utilize few generators to supply all the electrical power requested by the sorter with power peaks of about 8 KW without need of electric accumulators.

The generators are connected to as many stabilized power supply units that adjust the output voltage with high accuracy, so that the power supply units can be connected in parallel to equally divide their contributions.

The generators groups are complex and high costs because the articulated arm and the transmission require great mechanical accuracy.

Moreover, large power handling implies further expenses and complexity to add safety features to protect against effects of one failure mode that could increase the force applied by the carriage on the tracks up to dangerous values.

BRIEF DESCRIPTION OF THE INVENTION

The present invention provides a solution to make electrical energy available onboard the sorter, without the above mentioned constraints and problems.

Figure 3:
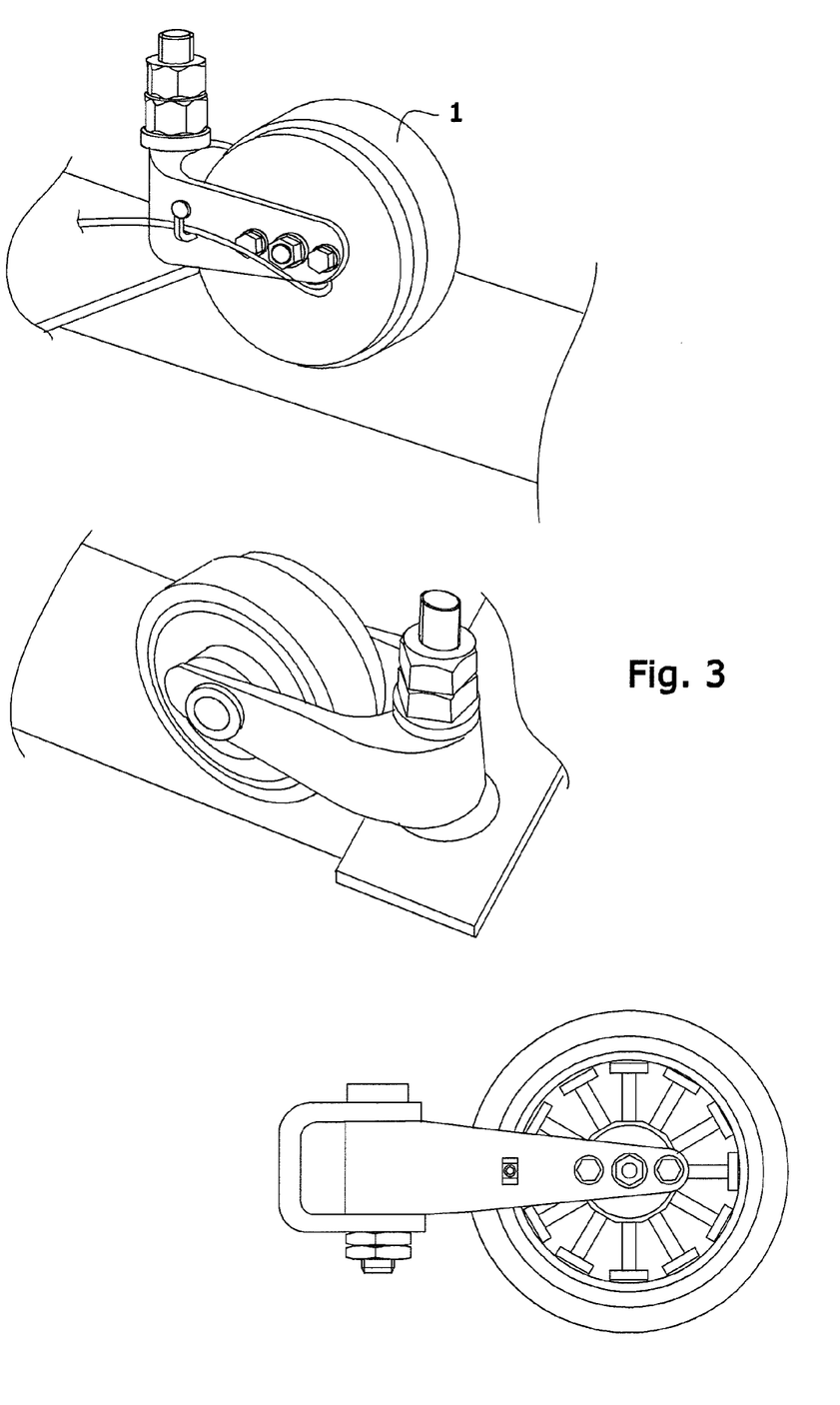
FIGS. 3A, 3B and 3C are general views of a supporting wheel according to the invention

As in the previous solution, electric energy is provided on board by alternators that are driven by wheels which take mechanical power from the sorter carriage motion. But the new solution gives the possibility of taking full advantage of small and unregulated electrical power contributions coming from hundreds of sorter wheels, summing them into a common power distribution system that supplies all the power requested by the motors on board. Many support wheels of the sorter (Ref 1 of FIG. 2) are substituted by special wheels that are able to generate electrical power (FIG. 3).

The small amounts of power provided by the wheels can be summed in a simple way without the need of any individual electronic regulation circuit to energize the servo amplifiers of the sorting motors, improved to accept supply volatage varying in a very wide range.

This new concept allows for simple, low cost and robust solutions to supply the sorter motors on board: the solution does not require energy accumulation, neither converters to increase the voltage value, nor regulator device to enable the parallel operation.

Besides the cross belt sorters, the solution is applicable more in general to all machines including trains of interconnected carriages that need electric energy onboard to power intermittent operation of motors or other actuators.

In particular, the solution is applicable also to tilt tray sorters that use electric motors to tilt the tray in order to let transported items slide toward their destination.

DETAILED DESCRIPTION OF THE INVENTION

A basic characteristic of the alternator wheel is the capability to generate high frequency three-phase voltage of high value in spite of the low rotation speed: the tangential speed of the wheel is equal to the sorter speed since the wheel does not include any speed multiplier.

To get a solution for free maintenance and with life cycle longer than that of the installation, gear transmission to multiply speed has not been considered.

When the sorter runs at 2 m/sec, one wheel of 120 mm diameter has a low rotation frequency of only 5 Hz, i.e. 300 rpm. In spite of that, the a.c. voltage produced has to be at much higher frequency, i.e. about 50 Hz, in order to obtain d.c. voltage with low ripple using simply rectifying diodes.

Moreover, the alternator wheel shall produce also high voltage in spite of the low rotation speed, to be able of directly supplying the onboard servo amplifiers. The servo amplifiers require a high voltage, about 70V, to reduce the current value for a given power, thus reducing motor size and the losses of power.

Figure 4:
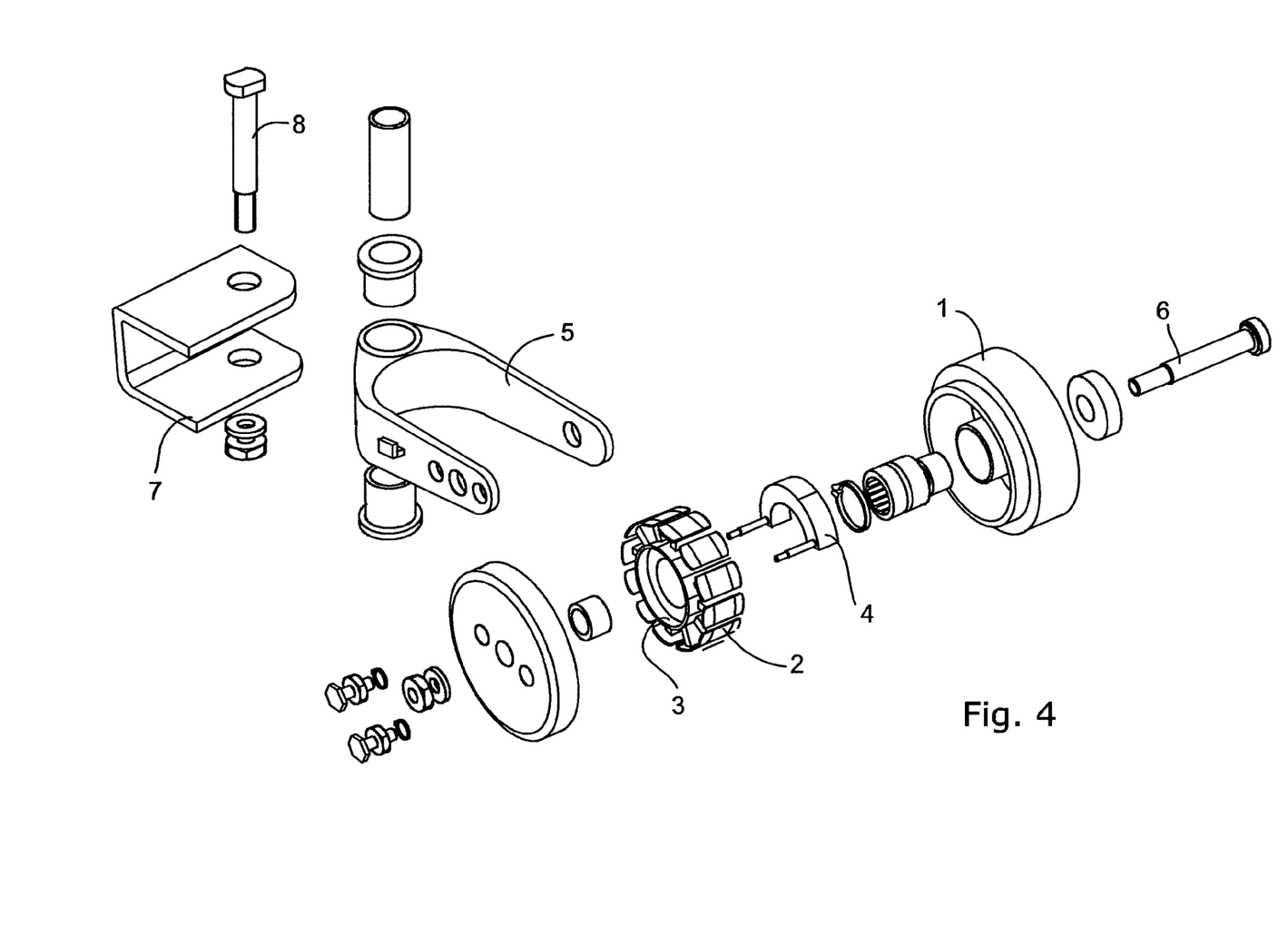
FIG. 4 shows the components of the wheel as shown on FIG. 3

To achieve these objectives, the alternator wheel has been designed as shown in FIG. 3 and FIG. 4, using the available know how to manufacture high performance motors.

Figure 5:
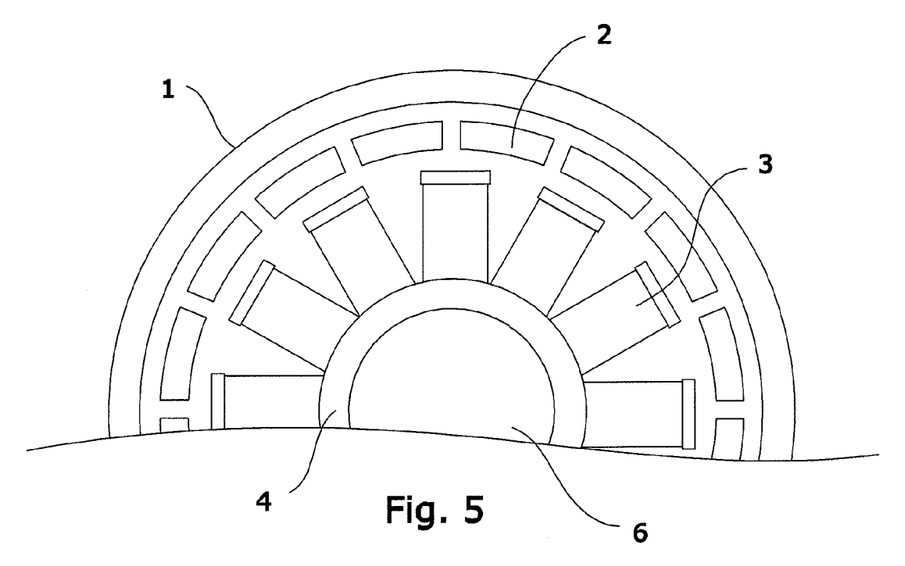
FIG. 5 is a detailed view of the arrangement of the magnets in the crown and of the windings in the stator

The wheel is made up of a steel structure lined with polyurethane rubber (1), the outer ring hosts a great number of permanent magnets that are arranged in alternating magnetic polarity as per FIG. 5.

Referring to FIG. 4, the ring with magnets is the rotor and spins around a multiple poles stator (3) that is integral with the fork supporting the wheel (5) through the bracket (4).

Spinning of the wheel around the shaft (6) through the two bearings, causes the rotor magnets to move in front of the stator windings, producing variations of the magnetic flux which crosses the windings of the stator.

The variable magnetic flux concatenated to the stator windings causes induced voltages across the windings.

If an electric load is connected to the stator windings, induced voltage causes current to flow in it, thus producing work.

The alternator wheel performs also the same function as a supporting wheel of the carriage: the fork (5) supporting the wheel spins around the pivot (8) with respect to the carriage frame (7) when it is moving in the curve.

It features the same static load resistance as a normal supporting wheel, it is equipped with the same bearings and coated with elastomeric material, exactly like the other wheels.

As detailed on FIG. 5, twelve permanent magnets (2) of rare earths are used for their possibility of high magnetic induction vector as well as one stator including 16 poles with as many windings (3) are used to meet the requirements of high voltage and frequency in spite of low rotational speed.

The external ring (1) and the internal ring (4) are made of steel with high magnetic permeability to form magnetic circuits with low reluctance.

As shown on FIG. 5, the arrangement of the magnets in the crown and of the windings in the stator causes that same magnetic condition is repeated at every 90 degrees angular displacement of the rotor, that is the induced voltage repeates identically (one phase) in windings separated by 90 degrees angle.

For each of the three phases, identified by the poles (5), (6) and (3), there will be four windings: the windings corresponding to each phase are connected in series to increase the voltage value of the three phase output.

As example, in a practical réalisation mode, at 2 m/s, the alternator wheel is able to produce a three-phase voltage at a frequency of 42 Hz that, rectified by a full wave diodes bridge, generates an open circuit voltage of 80V: connected to a load, it is able to supply about 20 W electric power with 60V on the load.

At 2.5 m/s, the alternator wheel supplies open circuit voltage of about 100V and connected to a load provides 30 W power with about 70V on the load.

Figure 6:
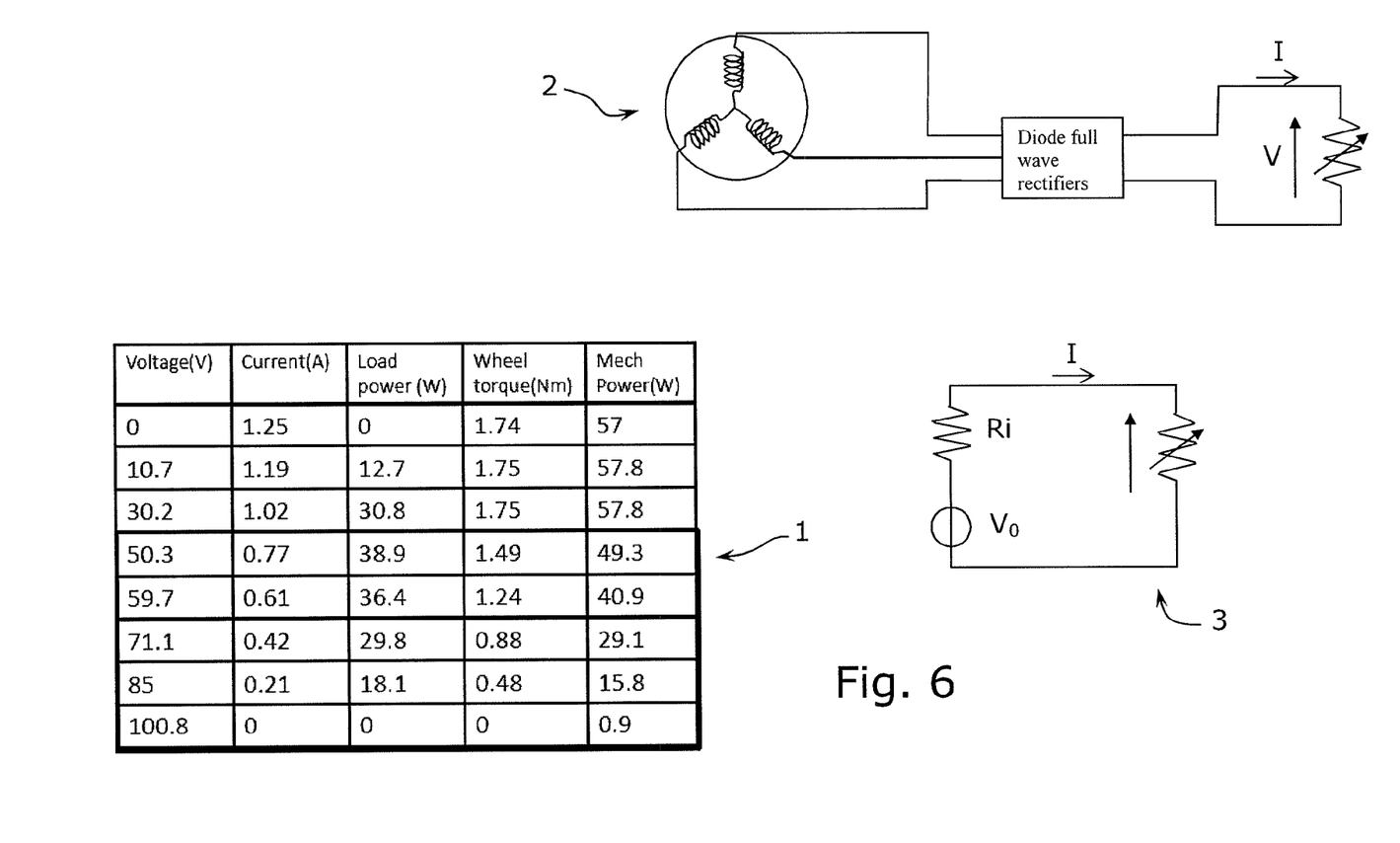
FIG. 6 is a Table of experimental data measured when the sorter is running at 2.5 m/s

The sorting applications requiring more power are usually operated at 2.5 m/s. FIG. 6 shows a table of experimental data (1) measured when the sorter is running at 2.5 m/s, with values of voltage, current and power that correspond to various values of the load resistance and thus of the supplied power.

In the current range of values under 0.8 A, the alternator wheel (2) is electrically equivalent to the simple linear model (3) with an internal resistance of about 70 Ohm and an open circuit voltage about 100V.

When values grows over 1 A approximately, the linear model is no more accurate because the reduction of total magnetic induction flux becomes significant and, therefore, the power supplied would not rise linearly by increasing the current as predicted by the simple linear model: the load power reduces when the current increases, while the total mechanical power absorbed by the wheel remains constant.

However, the simplified linear model is valid for the application, because a great number of wheels will be used to supply the sorter required power and each wheel will operate away from its limitation zone.

The built-in limitation of power obtainable from the wheel, due to the flux reduction as the output current increases, has been tailored to simplify the application, because provides intrinsic protection of the wheel in case of short-circuits failures or low load impedance operational conditions.

The built-in limitation of the maximum mechanical power value that the wheel can require assures also the lifespan of the mechanical components: in particular the polyurethane coating of the wheel, even under extreme conditions.

In fact the built-in limitation in absorbed power reflects also in limiting the maximum braking force acting on the wheel: even in short circuit condition, the wheel will not be subjected to any sliding effects which would reduce the lifespan of its polyurethane coating.

At the maximum power of about 60 W which can be absorbed by the wheel, the braking tangential force is about 22N: even considering the lightest applications, a weight force of at least 150N rests normally on the wheel due to the carriage weight; therefore, the wheel could never slide because it is pressed against the track by a force three times greater than the force necessary to prevent sliding, considering the friction coefficient of the polyurethane against the track.

The electrical characteristics of the alternator wheel have been selected to let add up the power contributions of hundred of alternator wheels in a very simple way: the three-phase windings of each alternator wheel are linked to a full wave diode rectifier bridge to obtain a continuous voltage and the outputs are then directly connected in parallel onto one electrical distribution bus.

The current required by the overall load on the bus is sourced by all the alternators in parallel, contributions are rather equally divided thanks to high output voltage and large series resistance and the characteristics of the generating wheel to self-limit power far below the damage threshold.

Since the alternator wheel can be manufactured industrially with low costs, the possibility to have the necessary power available onboard just replacing some hundreds of wheels with alternator wheels connected in parallel results to be very convenient if compared to all solutions applied until today.

It is convenient both in terms of savings on the entire product life cycle and of the operational safety due to the intrinsic tolerance of multiple failures provided by parallel connection among several independent generators. The supply obtained by parallel connection of hundreds of generating wheels provides not regulated voltage with residual series resistance that is not negligible. Therefore, it is fundamental that the users, that is the servo drivers controlling the electrical motors of the belts, are designed to work properly in presence of great supply voltage variations. The large power variations required during the sorter operation (e.g. from 1000 W to 8000 W) will in fact result in large voltage variations on the bus, as illustrated in the following analysis.

Figure 7:
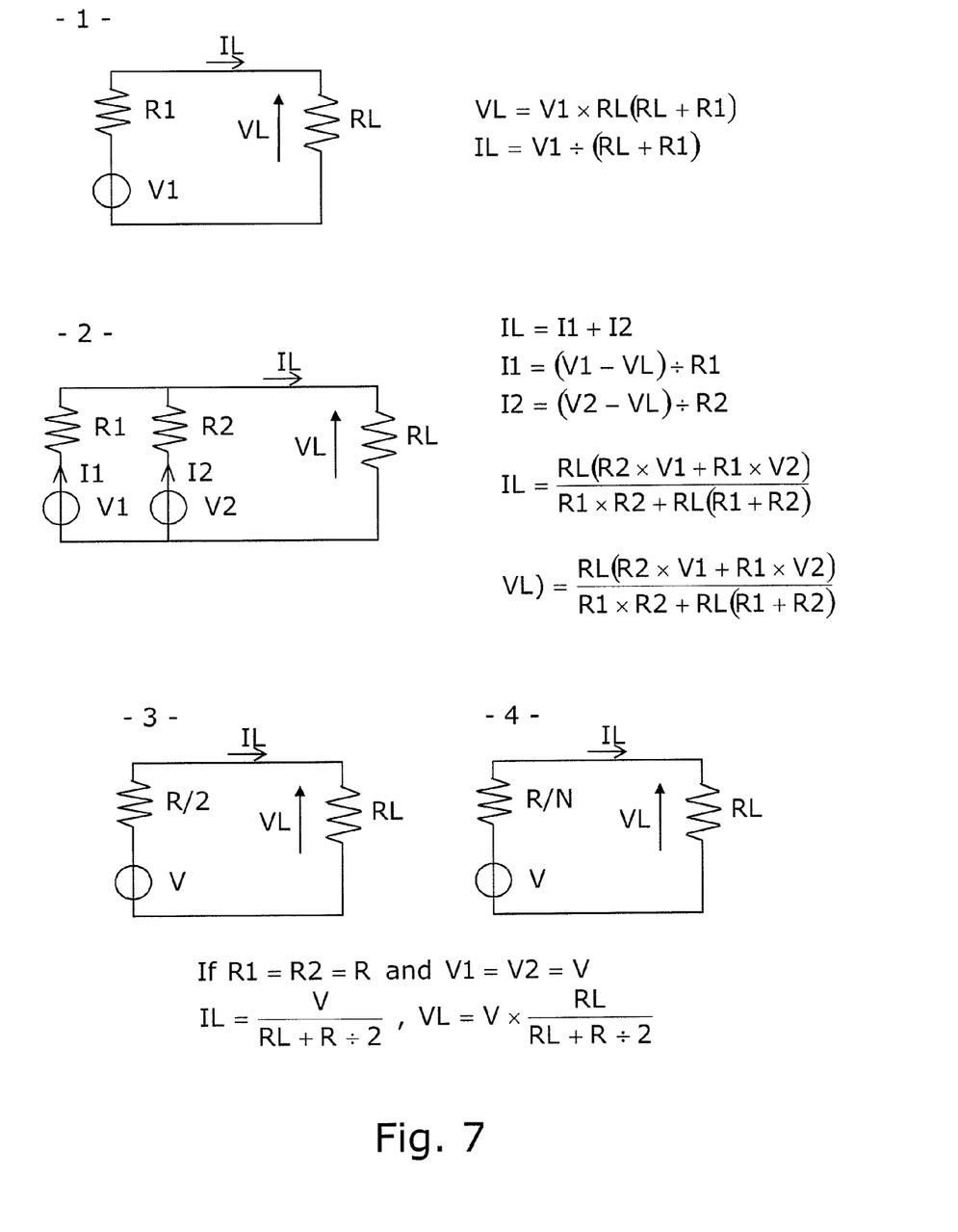
FIG. 7 shows examples of connection of the two alternator wheels

FIG. 7 shows in (2) the parallel connection of two generators that supply power to one load resistance RL, using the simple linear model of the alternator wheel.

Assuming that both generators have identical electrical characteristics, voltage per speed unit and internal resistance, i.e. V1=V2 and R1=R2 as per (3) of FIG. 7, the parallel connection of both generators is just equal to one generator only with the same voltage and with the internal resistance equal to half the resistance of each generator.

The relations illustrated as per (2) allow estimating the contributions in case the electrical parameters of both generators are not identical. In the manufacturing process of the alternator wheels, variations of about 5% are to be considered in the electrical parameters values.

Using the linear model, it is possible to verify that these variations simply turn into proportional variations in the power absorbed by the generators.

Therefore, it is reasonable to assume that the parallel connection of generators is equivalent to the parallel connection of identical generators with open circuit voltage value and internal resistance value resulting from the average measurement in one production lot, as shown by the scheme (4) in FIG. 7.

Figure 8:
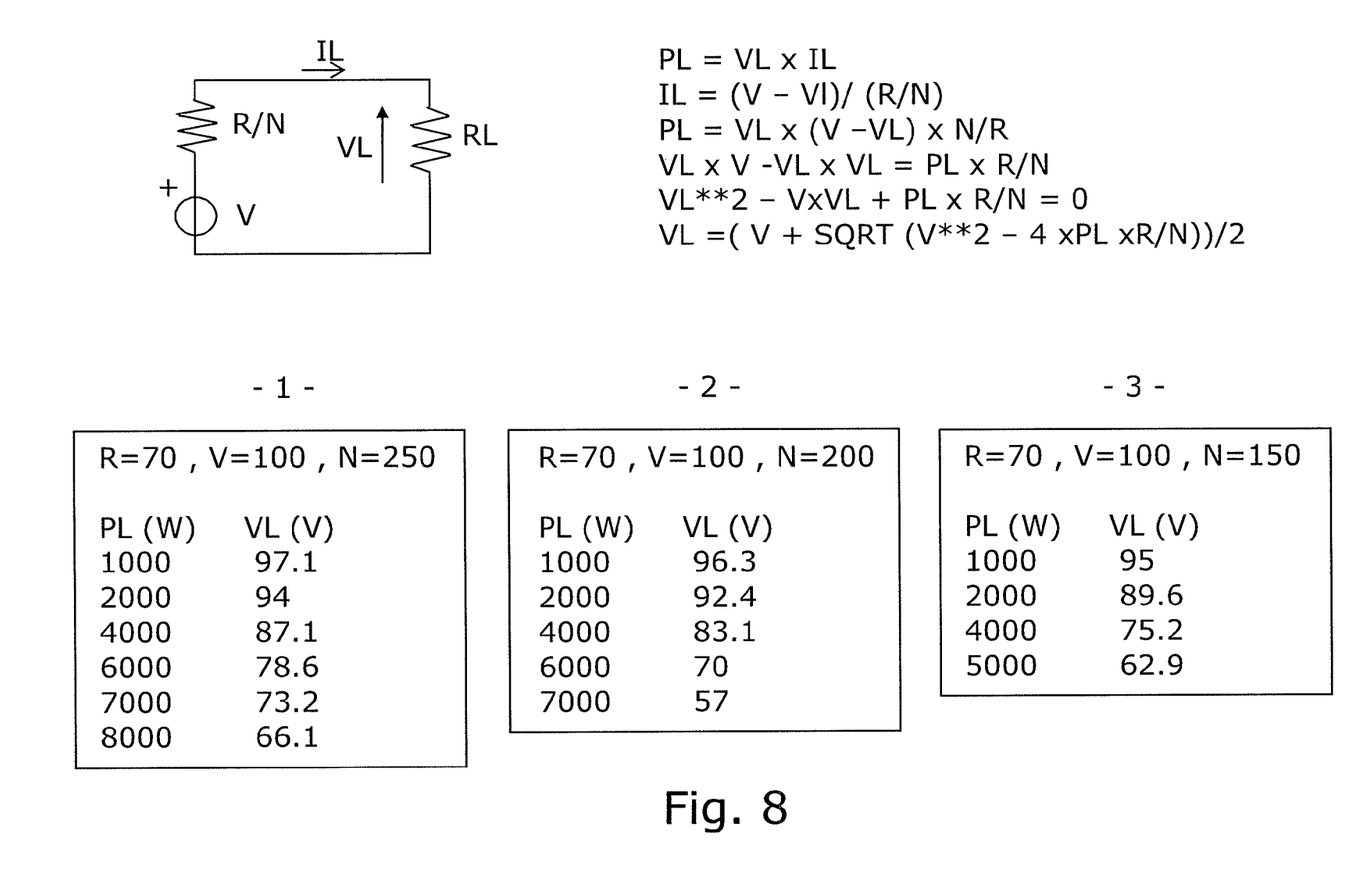
FIG. 8 shows example of results: voltage versus absorbed power for three applications with different number N of generating wheels

FIG. 8 shows the results of the simple linear model with reference to possible applications requiring various powers. Table (1) refers to the parallel connection of 250 alternator wheels in a high capacity sorting application for heavy parcels working at 2.5 m/s and requiring a peak power of at least 8000 W.

The tables (2) and (3) refer to applications requiring lower peak powers.

Looking at the tables, it is worth noticing that the voltage on the distribution bus depends on the power absorbed by the load:
in table (1) the voltage goes from about 100V, when the absorbed power is 1000 W, to 66V when a power peak of 8000 W is absorbed.

The example proves that the alternator wheels can offer a simplified solution to meet the requirements of the various applications, provided that the servo drivers are able to use the available power, in spite of the relevant voltage variation, almost 100%, without jeopardizing the sorting accuracy.

The extreme variability of the onboard electrical load is a peculiarity of the sorting applications: each servo driver absorbs power of about 2 W in the resting condition; it absorbs a short power peak, when it is activated to unload an item; the power peak changes according to the item weight up to 1000 W for item weighing 50 kg.

The average electrical load on the distribution bus depends on the number of carriages forming the sorter and on the average productivity of the sorter in the stationary mode: in a practical application for parcels the average power will be in the order of 2500 W.

Dynamically, the electrical load depends on the weight of the sorted items, which can often vary from few grams up to 50 kg, as well as on the number of activations that occur at the same time, accordingly to the random combinations of the item destination.

However, since the sorter layout is a circular track, it is possible for the control system to re-circulate items, to be sorted on next lap, when the number of sorter activation at the same time exceeds a safety factor.

In a practical application for parcels, the power peak is limited to about 8000 W: this value is large enough that re-circulation does not practically influence the sorter throughput.

Such large variations of power reflect in large variation of the bus voltage: in order to reduce the servo driver sensitivity to large voltage variations, it is necessary to add to the basic closed loop speed control functions the capability to react promptly against on each carrier, instant variations of the supply voltage, in order to reduce effect on motor current and therefore on torque.

Figure 9:
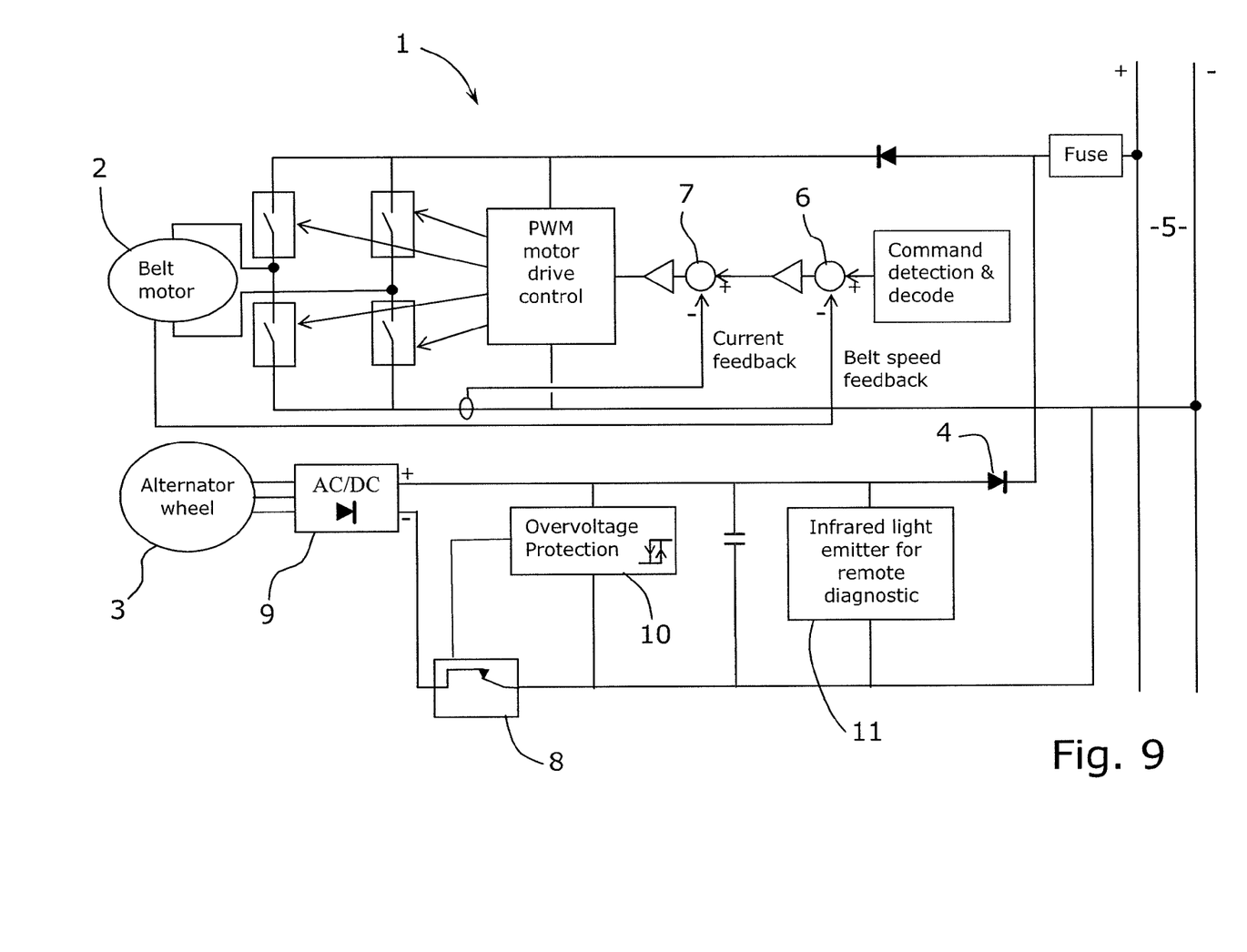
FIG. 9 is a view of the block diagram of the electronic unit of one sorter carriage equipped with generating wheel

Since there is one servo drive unit connected to the distribution bus, on each carrier, it is convenient to use directly the servo drive units also to collect power from the alternator wheels and to supply the distribution bus as shown on FIG. 9.

The FIG. 9 is a simplified block diagram of the electronic unit used to control the activation motor (2) of the sorting belt. It is mounted on each carriage and picks up electrical power from the distribution bus (5).

In case the carriage is equipped with an alternator wheel (3), the three-phase output of the wheel is connected directly to the electronic unit.

The three-phase voltage generated by the wheel is rectified by the diode bridge (9) and the d.c. voltage output is applied to the distribution bus (5) by means of the diode (4).

FIG. 9 shows the overvoltage protection unit (10) to limit the voltage value provided by the alternator wheel when the sorter runs at high speed and the power consumption on board is very low.

When the rectified voltage produced by the alternator wheel, leveled on the storage capacitor, is over 100V, a comparator circuit with hysteresis will isolate temporarily the generator from the load, acting on the solid state switch (8).

As the voltage across the capacitor 1 decreases below the lowest threshold of the comparator, the generator is turned on again for a new cycle: in case of relevant power absorption, the voltage on the bus will decrease, the voltage at the condenser heads will decrease steadily under the threshold and under these conditions, the switch (8) will be kept always on.

The upper part of FIG. 9 shows the block diagram of the servo driver including feedback regulation loops for the speed (6) and the current (7), the diagram refers to the control of a d.c. brushed motor, but the following remarks can be applied to synchronous brushless motors or asynchronous induction motors as well.

In the block diagram of FIG. 9, the instant value of the current is the regulator variable and it results from the comparison (6) of the reference value of the speed sorting profile with the instant motor speed detected by the sensors.

The instant speed error is properly amplified and it determines the current value, therefore, the torque that is necessary in order that the motor speed follows accurately the required speed profile.

Not shown but included with the amplifier (6) are the phase compensation circuits: these also provide corrections proportional to rate of change and to the average value of the speed error.

Phase compensation is necessary for stability, mainly in presence of the high amplification values which are necessary to get requested accuracy.

The described closed loop regulator reduces already dependence to the power supply voltage value: as example, reduction of the power supply voltage reduces the current, thus the torque, consequently the motor does not follow exactly the speed profile, the regulator speed error increases which determines the current and the torque to increase.

For the application of the generating wheels it is necessary accurate, in spite of very large variations of the supply voltage, therefore, it is added an additional regulation loop (7) to react to any power supply voltage variations instantly: the necessary current profile produced by (6) for the control in speed is compared with the instant value of the current in the motor (which is directly influenced by the power supply voltage), the error signal is amplified and it varies the full/empty relation of the PWM (pulse width modulation) with the necessary phase compensation.

Besides the current value measure the get the feedback term, the error signal includes also a measure of the voltage variation to get a feed forward contribution which improves response time.

In the example, reduction of the power supply voltage value would decreases the current in the motor, the error in the current loop increases, thus the PWM open/close ratio relation is increased, which means that voltage is applied to the motor for a longer time: as a result the current is kept constant although the voltage value is reduced. This result is allowed by the fact that the impedance in the motor winding is mainly inductive and, consequently, the current is given by the integral function of the applied voltage; therefore it depends on both the voltage value and on the time during which the voltage is applied.

Therefore, when the voltage value decreases it is possible to keep constant the current increasing proportionally the time during which the voltage is applied to the motor. This is possible using the PWM (pulse width modulation) technique that is already present in the d.c motor servoamplifier shown at Ref (1) of FIG. 9. The current is controlled through the modulation of the duration of the impulses used to cyclically open and close the solid state switches that connect the motor to the power supply in order to set direction and intensity of the current passing through the stator winding of the motor. By sensing the instant current value, it is possible to compensate for voltage variation making the operation of the servo drivers independent from the power supply voltage.

Of course, there is a minimum voltage value under which it is not possible to obtain the current value that is necessary in order to sort a heavy parcel properly: for this reason the servo driver is equipped with a circuit (12) that prevent starting a new sorting command when the voltage on the distribution bus is lower than the minimum threshold.

In this event this control does not interrupt sorting commands already in execution but prevent any new command to start execution.

In the carousel type sorters as the cross belt it is possible to skip the sorting of a parcel and to "re-circulate", that is sorting the parcel on the next lap of the sorter.

System throughput is reduced by re-circulation of parcels but practical effect is depending on frequency of occurrence. So this possibility can be used effectively to prevent excessive lowering of the bus voltage caused by unlikely events of a large number of contemporary sorting activations.

The circuit (12) performs a complementary action with respect to the sw protection: sw will limit the maximum number of contemporary actions but cannot effectively act on the actual power peak value, since the power of each action depends on the parcel weight which is generally not known.

By adding the control performed by circuit (12) the power requested to the bus will result automatically limited in order to prevent excessive lowering of the bus voltage.

When the bus voltage is lower than the threshold, the circuit (12) will skip only new sorting commands but will not skip activation commands to run the cell belts while loading parcels, otherwise we would cause bad parcels positioning on the cells and consequently possible damages. Belt activations on loading are low power request and the total power is practically a constant value, not subjected to large power peaks for statistical combinations as the sorting actions.

The cell belt activations on loading are possible even when the available bus voltage is low because the necessary belt speed is very low.

Moreover heavy parcels, when loaded, give energy rather than requiring: since the motor controller are re-generative type, the belt activation on loading become power source: the motor servo has to stop the heavy parcel on the cell belt, so it has to brake by the motor converting the kinetic energy of the parcel into electrical energy, transferring to the distribution bus by increasing of the bus voltage.

The circuit (12) is able to distinguish sorting commands (to be skipped when the bus voltage is below a threshold) from belt activation commands on loading (that cannot be skipped because of possible damages) since these latter are characterized by different pulse time modulation.

Sorting command is a single pulse, at least 100 ms period, of frequency modulated signal.

Activation command on loading is formed by time modulation of short pulses 5 to 20 ms about, each pulse including frequency modulated signal (time modulation of pulses is used to precisely adjust the belt speed on loading).

By detecting short pulses, the circuit (12) is therefore capable of identifying activation command on loading.

In the end, it is possible to benefit of the simple solution of the alternator wheels in parallel, by using the resources of the PWM control of the servo drivers, without affecting the sorting accuracy, in spite of large voltage variations, from about 55 Vdc to over 100 vdc in a practical realisation.

Figure 10:
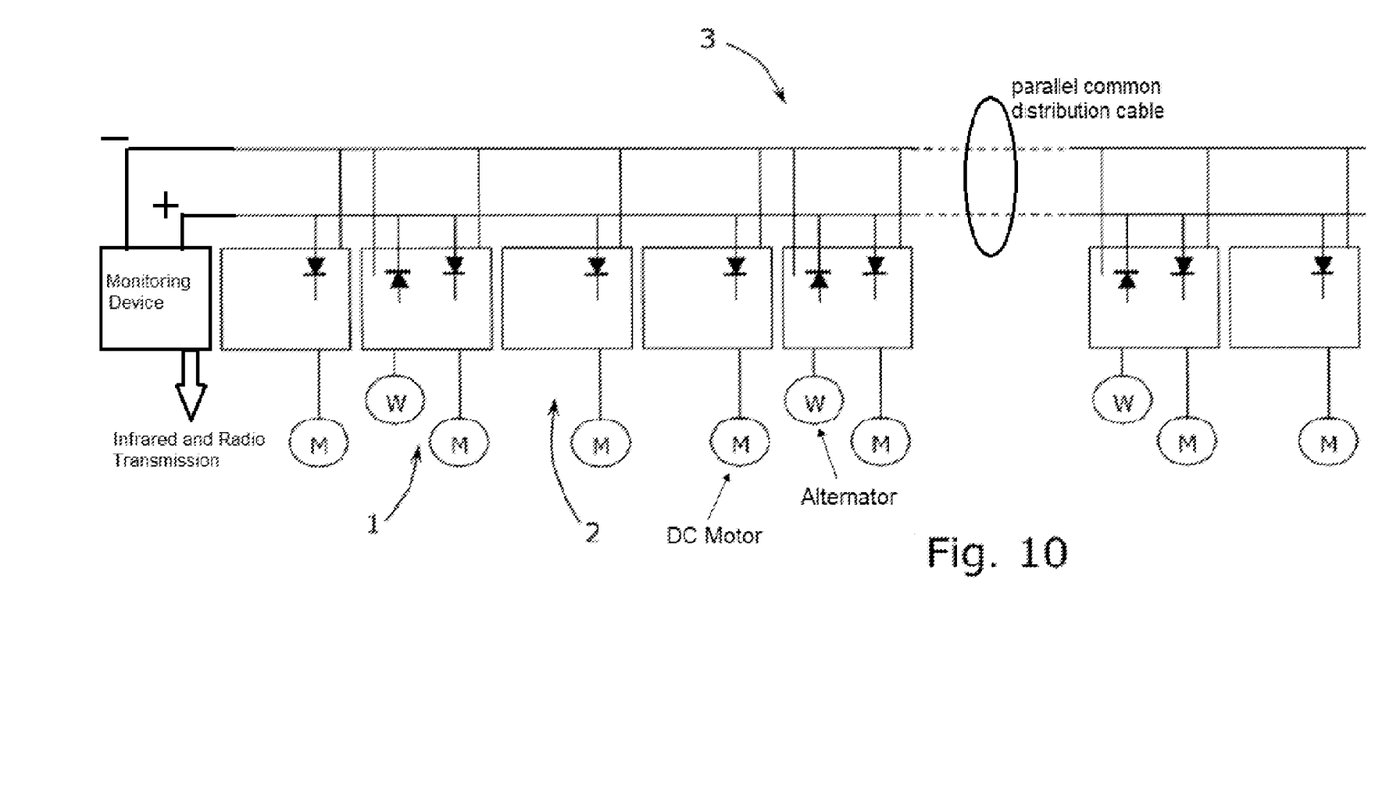
FIG. 10 is a schematic electrical diagram of a train of carriages.

The FIG. 10 shows a train of carriages fed by the distribution bus (3) including the servo drivers (1) for controlling the motor of the sorting belt and for collecting the power contributions that the alternator wheels put on the bus. They alternate with servo drivers which are dedicated to the belt motor (2) only.

The following section includes an analysis of the possibilities of failures and of the remedial solutions. The new supply system can easily tolerate the failures even of several alternator wheels in parallel without affecting the sorter operation.

To simplify maintenance, the system is equipped with a solution for the automatic check of the operation status by means of remote diagnostics: presence of voltage over a minimal threshold value enables the emission of an infrared light modulated (Ref (11) in the FIG. 9).

One receiver installed on ground and connected to the control system of the sorter allows the identification of the malfunctioning generator for the differed maintenance: the control system knows at any time the position of all carriages with respect to the receiver of infrared signals: in case one infrared signal is missing from a carriage provided with alternator wheel, the event is recorded for the differed maintenance.

The supply system is vulnerable only to events that could interrupt the cables of the distribution bus because in that case the alternator wheels are no more connected in parallel and therefore the premise for the dimensioning according to the required power is no more valid.

Since the distribution bus includes connectors on each carriage, to make the mechanical maintenance easy, it is possible that a connector pairs can be left unintentionally disconnected creating an interruption on the distribution bus.

Using a third wire in the distribution bus cable, it is possible to detect such interruption.

The third conductor of the cable will be connected to the positive pole on the last carriage of a train:

Testing on the first carrier of the train the presence of positive polarity on the third cable will then demonstrate that all connectors are properly connected.

This condition will be remotely controlled since an electronic unit on the first carrier, detecting the positive polarity on the third cable, produces a modulated infrared signal that will be detected by the monitoring station linked to the control system.

When the infrared signal is not received within the proper time windows (the control system knows when the first carrier of the train is over the monitoring station), the control system is alerted that the distribution bus of the train is interrupted.

But the monitoring station alone will not give useful indication to locate interruption because all the train connectors are in series.

The solution to allow localization of the open connector along the train is possible using bus connectors on each carriage provided with secondary pins to have an interlock connection.

Therefore, the servo driver of one carrier will not receive power supply if the connector of that carrier is left disconnected.

In case of bus interruption, the open connector will be easily located between those carrier that are detected as fault by the test station that systematically checks the correct operation of the sorting belts of the sorter. Additional diagnostic function is achieved by monitoring the distribution bus voltage correlating the value to actual sorting activity. This control function is executed by the sorter control system which receives regularly the voltage measure of the distribution bus by using wireless radio transmitters solutions that are available at low cost on the market.

Power sizing of the supply solution is an optimization problem that has effects also on failure analysis. As already discussed, the sorter application typically requires low average power, as 3 kW, but the possibility of higher power peaks, up to 8 kW, has to be considered. Power peaks are isolated, that is, the control system can prevent repeating a second power peak at few second from the first. The probability of a second power peak at few seconds from the first one is extremely unlikely in the practical cases, therefore, the control system will prevent the second peak by commanding parcels re-circulation, without practical losses of throughput.

An obvious solution is to size the whole system for the peak power, in using the necessary number of generating wheels in parallel: by this solution the cables and the connector should be rated for the max short circuit current that is almost three times the operating condition.

This solution is not economically justified and has negative effect on the carriage design due to component dimension.

A better solution is to size the whole system over the average power consumption, as 4 Kw, but far below the peak power of 8 Kw, adding the capability of necessary power peaks through energy stored in electrolytic capacitors, taking advantage of the new technology of "ultra-capacitors" available on the market.

Energy stored in capacitors can be transferred during discharge to servoamplifiers if these are able to correctly operate while supply voltage varies in a wide range, as was discussed previously.

Ultra-capacitors are electrolytic type capacitors which provide very large capacity thanks to new technology, using very high dielectric material between capacitor armatures and carbonium armature walls to increase the surface. By combining in series and in parallel, commercially available ultra-capacitors, it is possible to get an overall capacitor pack of 1 Farad and 80V in a compact and low weight unit that can be easily installed on one sorter carriage.

In a practical case, this unit can provide a power peak over 500 W, for one second while discharging from 80 to 70 volts. By adding few of those units in parallel to the distribution bus, it is possible to size the supply system over the average power consumption of the sorter still providing the possibility of isolated power peaks.

Cable and connectors can be rated slightly over the max operating power since in case of bus short circuit since the steady short circuit current is low.

This solution is the best from the economical and energy efficiency points of view, and life of the ultra-capacitor can be increased over the sorter life, by adding to the capacitors an electronic control unit to limit the charge current, to balance and stabilize the voltage across the capacitors and to control the capacitor temperature.

The invention claimed is:

1. A Sorting machine, comprising:
propulsion devices installed on ground; and
at least a train of interconnected carriages provided with a plurality of supporting wheels including electrical alternators housed within the plurality of supporting wheels to supply electrical power onboard to a parallel common distribution cable,
wherein each of the interconnected carriages comprises an onboard servo driver to activate a sorting machine, the sorting machine comprising a control system, wherein all electrical alternators are configured to be connected in parallel to the parallel common distribution cable by rectifying diodes bridges without using any voltage regulator device.

2. The sorting machine according to claim 1, wherein each connector of each interconnected carriage is provided with secondary pins to make an interlock connection to cut power to the onboard servo driver when a connector is disconnected to allow the control system to detect and locate the connector, wherein the control system is configured to monitor regularly each carriage condition during each sorter operation, and identify the onboard servo driver not being powered.

3. The sorting machine according to claim 1, wherein the onboard servo driver of the sorting machine includes a circuit to temporarily disconnect an alternator from the parallel common distribution cable when a voltage generated by the alternator is over a maximum limit.

4. The sorting machine according to claim 1, wherein alternators have characteristics in a function of magnetic flux reduction versus requested power and in an internal resistance of windings to prevent any possible thermal damage to at least one of the plurality of supporting wheels and to a polymeric covering of the at least one of the plurality of supporting wheels in case of an electrical short circuit.

5. The sorting machine according to claim 1, wherein any number of alternators of the sorting machine are configured to be connected in parallel to the parallel common distribution cable to provide for a necessary maximum power peak without requiring any electrical energy accumulation devices including batteries or devices at very high capacity for operation.

6. A Sorting machine, comprising:
propulsion devices installed on ground; and
at least a train of interconnected carriages provided with a plurality of supporting wheels including electrical alternators housed within the plurality of supporting wheels to supply electrical power onboard to a parallel common distribution cable,
wherein each of the interconnected carriages comprises an onboard servo driver to activate a sorting machine, the sorting machine comprising a control system, wherein the control system is configured to limit a power peak required on the parallel common distribution cable by limiting a number of sorting activations for parcels requested at a same time below a safety limit, and a portion of the parcels not sorted are re-circulated to be sorted in a subsequent sorter lap.

7. The sorting machine according to claim 6, wherein the onboard servo driver of the sorting machine includes a circuit to temporarily disconnect an alternator from the parallel common distribution cable when a voltage generated by the alternator is over a maximum limit.

8. The sorting machine according to claim 6, wherein alternators have characteristics in a function of magnetic flux reduction versus requested power and in an internal resistance of windings to prevent any possible thermal damage to at least one of the plurality of supporting wheels and to a polymeric covering of the at least one of the plurality of supporting wheels in case of an electrical short circuit.

9. The sorting machine according to claim 6, wherein any number of alternators of the sorting machine are configured to be connected in parallel to the parallel common distribution cable to provide for a necessary maximum power peak without requiring any electrical energy accumulation devices including batteries or devices at very high capacity for operation.

10. A Sorting machine, comprising:
propulsion devices installed on ground; and
at least a train of interconnected carriages provided with a plurality of supporting wheels including electrical alternators housed within the plurality of supporting wheels to supply electrical power onboard to a parallel common distribution cable,
wherein each of the interconnected carriages comprises an onboard servo driver to activate a sorting machine, and each servo driver is configured to detect a present voltage value on the parallel common distribution cable, the present voltage value corresponding directly to a total power absorbed and decreasing while the total power absorbed increases, the total power absorbed resulting from the number of sorting activations within a same time interval and from a weight of parcels sorted, wherein each servo driver is configured to skip an execution of a new sorting command received if a measured voltage on the parallel common distribution cable is lower than a minimum threshold, and a portion of the parcels not sorted are re-circulated to be sorted in a next sorter lap.

11. The sorting machine according to claim 10, wherein the onboard servo driver of the sorting machine includes a circuit to temporarily disconnect an alternator from the parallel common distribution cable when a voltage generated by the alternator is over a maximum limit.

12. The sorting machine according to claim 10, wherein alternators have characteristics in a function of magnetic flux reduction versus requested power and in an internal resistance of windings to prevent any possible thermal damage to at least one of the plurality of supporting wheels and to a polymeric covering of the at least one of the plurality of supporting wheels in case of an electrical short circuit.

13. The sorting machine according to claim 10, wherein any number of alternators of the sorting machine are configured to be connected in parallel to the parallel common distribution cable to provide for a necessary maximum power peak without requiring any electrical energy accumulation devices including batteries or devices at very high capacity for operation.

14. The sorting machine according to claim 1, wherein the parallel common distribution cable includes a wire configured to detect interruptions of the parallel common distribution cable due to disconnected carriage connectors, wherein the control system is configured to locate the interruptions along the parallel common distribution cable.

* * * * *